Patented Feb. 24, 1948

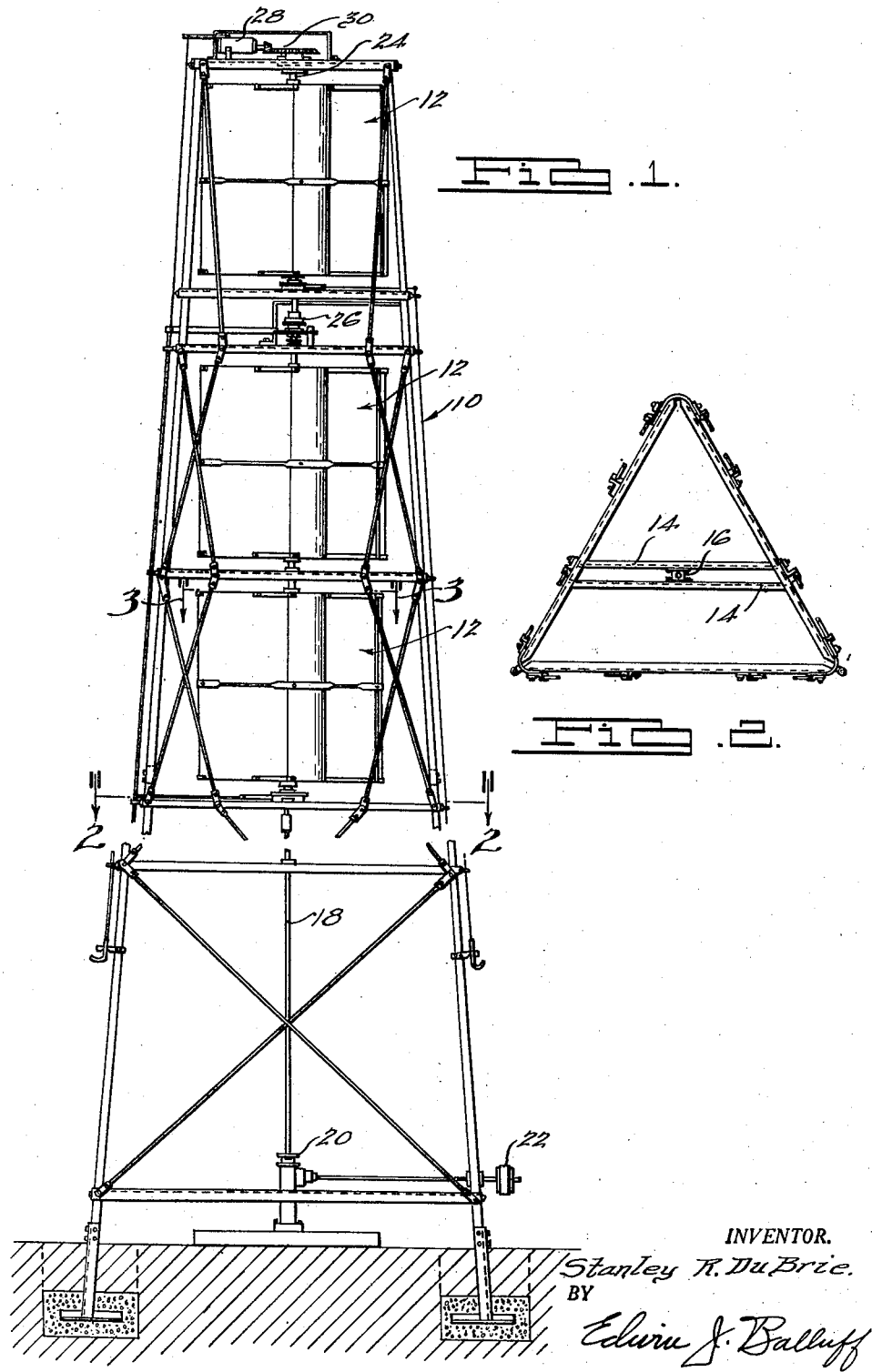

2,436,747

UNITED STATES PATENT OFFICE 2,436,747

WIND ROTOR

Stanley R. Du Brie, Detroit, Mich., assignor to Detroit Engineering Laboratories, Inc., Detroit, Mich., a corporation of Michigan Application October 28, 1944, Serial No. 560,859

5 Claims. (Cl. 170—36)

This invention relates to windrotors and has particular reference to a new and improved construction thereof.

Principal objects of the invention are to provide:

A new and improved windrotor, and

A new and more efficient blade for windrotors.

Other and further objects of the invention will be apparent from the following description and claims and will be understood by reference to the accompanying drawings which, by way of illustration, show preferred embodiments and the principles thereof and what I now consider to be the best mode in which I have contemplated applying those principles. Other embodiments of the invention embodying the same or equivalent principles may be used and structural changes will be made as desired by those skilled in the art without departing from the present invention and the purview of the appended claims.

In the drawings:

Fig. 1 is an elevational view of a device embodying the invention;

Fig. 2 is a horizontal sectional view taken along the line 2—2 of Fig. 1;

Figure 3:
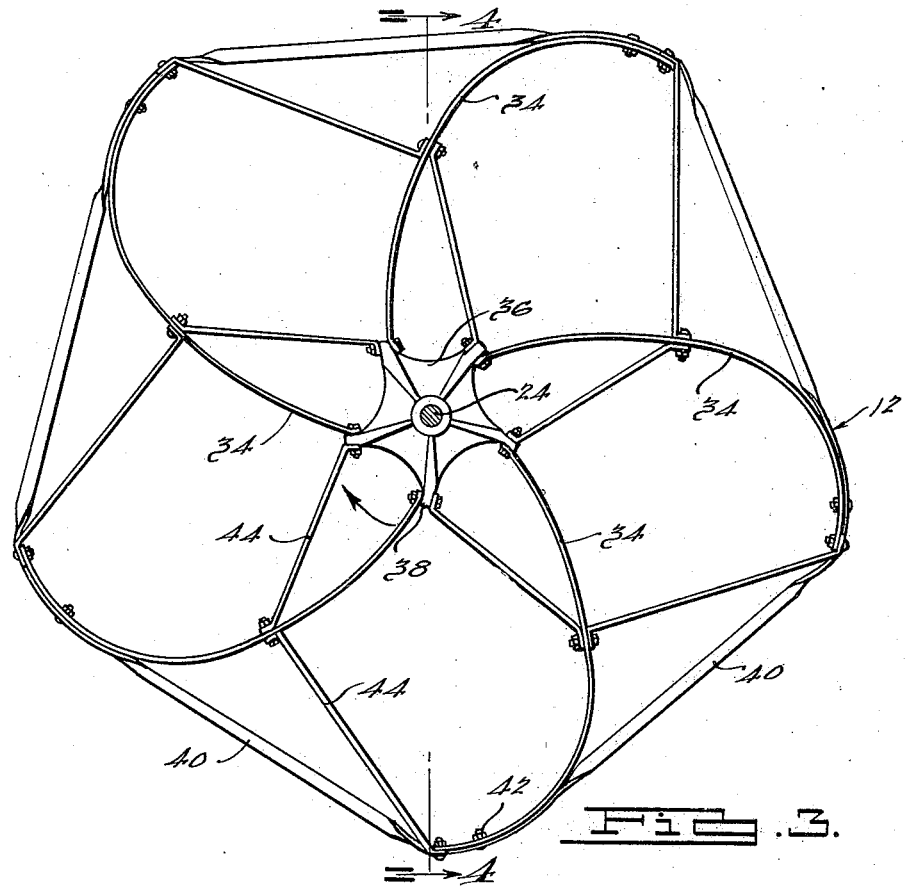
Fig. 3 is an enlarged plan view of one of the windrotors.

Referring now to Figs. 1 and 2, there is illustrated a tower 10 having a series of windrotors 12 mounted thereon. The tower may be constructed in any suitable manner but as illustrated in the drawings is made up of suitable connected horizontal and vertical frame members of open work construction so as to expose the windrotors 12 to air currents from all directions. The tower may be triangular in cross section as illustrated in Fig. 2 and have horizontally extending frame members 14 arranged as illustrated in Fig. 2 so as to provide a support for bearings 16. The windrotors 12 are arranged for rotation about a vertical axis with one of the windrotors 12 arranged above the other and in alignment therewith. As illustrated in Fig. 1 the lower two of the rotors 12 are fixed to a shaft 18 for rotation therewith, such shaft being journaled in bearings such as 16 so as to support the rotors 12 for rotation about a vertical axis.

The shaft 18 at the bottom may be connected through a clutch 20 with a pump or with a drive pulley 22 for utilizing the output of the windrotors for driving suitable machinery. The upper windrotor 12 is mounted on a shaft 24 suitably journaled in bearings such as 16, such shaft 24 being in line with a shaft 18 and being adapted to be coupled therewith by manually controlled clutch 26. When the clutch 26 is engaged the power of all of the windrotors is available for driving the pump and/or the pulley 22 and/or a generator 28, the armature of the generator 28 being connected through a suitable bevel friction drive 30 with the upper end of the shaft 24. When the clutch 26 is uncoupled the power of the windrotor 12 only is available for driving the generator 28. Suitable provisions may be made for controlling the operativeness of the clutch 26 and clutch 20 as well as the driving connection between the windrotor 12 and the generator 28.

Figure 4:
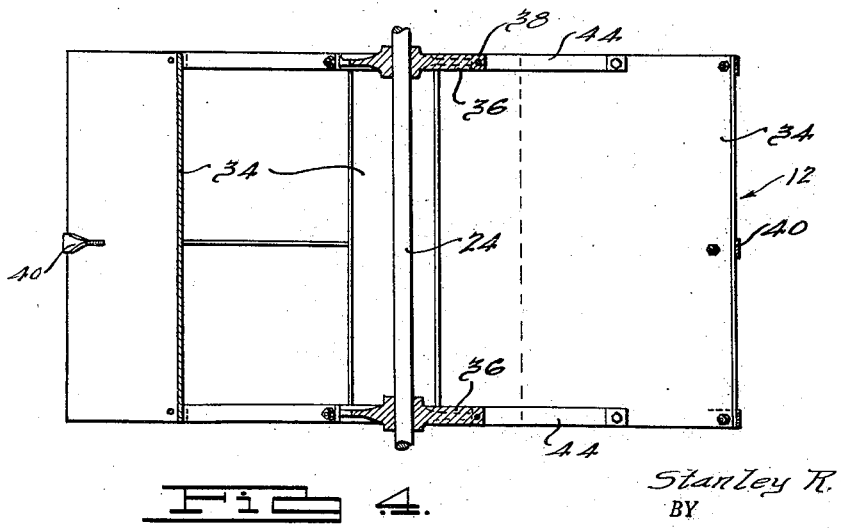
Fig. 4 is a vertical sectional view taken along the line 4—4 of Fig. 3.

Referring now to Figs. 3 and 4, enlarged plan and sectional views of one of the windrotors 12 are illustrated. Each windrotor comprises a series of vanes 34, each vane 34 having a surface extending outwardly from the axis of rotation of the windrotor. The inner edges of each of the vanes 34 are spaced from each other and from the axis of rotation of the rotor so as to permit the flow of air therethrough. Each of the vanes 34 comprise a curved blade, the outer edges of which extend in a direction opposite the direction of rotation of the rotor so as to present a streamlined convex surface toward the wind as the vane moves opposite the direction thereof and a concave surface toward the wind as such vane moves in the direction thereof, the outer portions of the surface of the vanes being curved on a radius materially less than that of the inner portion. I have found that a radius of curvature of the outer portion approximating ⅓ of that of the inner portion to be particularly efficient.

A pair of spiders 36, one at the lower edge of the vanes 34 and one at the upper edge thereof and fixed to the shaft 24 for rotation therewith form a hub for the windrotors 12, the inner edges of each of the vanes 34 being bolted to a spoke 38 on the hub. I have found that windrotor of five equally spaced blades is particularly efficient. It will be observed that the outer edge of the blades terminates short of a projection of a diametral line passing through the hub adjacent the inner edge of the next blade on the concave side thereof. A tieband 40 extends around the outer periphery of the blades 34 intermediate the ends thereof so as to help maintain the shape of the rotor and distribute the load to which each vane 34 thereof is subjected as its concave side is exposed to the action of the wind. The tieband 40 is suitably bolted, as at 42, to each of the vanes 34. In order further to distribute the load to which each vane 34 is subjected and to hold the parts in their proper relation, braces or stress rods 44 connected at one end to the outer edge of one of the vanes 34, thence to an intermediate position of the next vane and thence to the hub adjacent the point of connection thereto of the next vane, are provided. In this way, each vane 34 at its outer portion is tied to the intermediate portion of the next vane on one side thereof and at its intermediate portion is connected to the outer portion of the next vane on the other side thereof. Also the intermediate portion of each of the vanes is directly connected to the hub. Braces 44 may be arranged adjacent both the upper and lower edges of the vanes 34.

When the windrotor is in motion the wind will enter the rotor between the vanes thereof and drive the same in the direction of the arrow indicated in the Fig. 3. As the vanes are open at the center the wind will pass directly through the opening at the hub to the space between two vanes on the downstream side of the windrotor, thereby relieving the vacuum between the blades on such side. The convex side of each of the vanes 34 as it moves against the wind presents a streamlined surface, which helps to reduce the back-pressure on the windrotors.

While I have illustrated and described a preferred embodiment of my invention, it is understood that this is capable of modification and I therefore do not wish to be limited to the precise details set forth but desire to avail myself of such changes and alterations which fall within the purview of the following claims:

I claim:

1. A windrotor comprising a series of vanes mounted on a hub, each vane having a surface extending outwardly from the axis of rotation of said windrotor, the inner edges of each of said vanes being spaced from each other and from the axis of rotation of said rotor, each of said vanes comprising a curved blade the outer edges of which extend in a direction opposite the wind driven direction of rotation of said rotor so as to present a convex surface toward the wind as said vane moves opposite the direction thereof and a concave surface toward the wind as said vane moves in the direction thereof, the outer portion of said surface being curved on a radius materially less than that of the inner portion, and stress rods between the outer edge of each of said vanes and the intermediate portion of the next vane and between such intermediate portion and the hub of the windrotor.

2. A windrotor comprising a series of vanes arranged on a hub, each vane having a surface extending outwardly from the axis of rotation of said windrotor, the inner edges of each of said vanes being spaced from each other and from the axis of rotation of said rotor, each of said vanes comprising a curved blade the outer edges of which extend in a direction opposite the direction of rotation of said rotor so as to present a convex surface toward the wind as said vane moves opposite the direction thereof and a concave surface toward the wind as said vane moves in the direction thereof, the outer portion of said surface being curved on a radius approximately ⅓ of that of the inner portion, a tieband extending around the outer periphery of said vanes and stress rods between the outer edge of each of said vanes and the intermediate portion of the next vane and between such intermediate portion and the hub of the windrotor.

3. A windrotor comprising a series of vanes, each having a surface extending outwardly from the axis of rotation of said windrotor, the inner edges of each of said vanes being spaced from each other and from the axis of rotation of said rotor, each of said vanes comprising a curved blade the outer edges of which extend in a direction opposite the direction of rotation of said rotor so as to present a convex surface toward the wind as said vane moves opposite the direction thereof and a concave surface toward the wind as said vane moves in the direction thereof, and the space between said inner edges being substantially unobstructed so as to provide for the free flow of air from the upstream side of one vane on one side of the rotor to the downstream side of a vane on the opposite side of the rotor, the surfaces of said vanes adjacent the inner edges of said rotor being arranged tangent to the axis of said rotor, the outer portion of said surface being curved on a radius materially less than that of the inner portion, spaced spiders to which the inner edges of said vanes are attached and forming a hub for said windrotor, and bracing means connecting intermediate and outer portions of each of said vanes to said spiders.

4. A windrotor comprising a series of vanes, each having a surface extending outwardly from the axis of rotation of said windrotor, the inner edges of each of said vanes being spaced from each other and from the axis of rotation of said rotor, each of said vanes comprising a curved blade the outer edges of which extend in a direction opposite the direction of rotation of said rotor so as to present a convex surface toward the wind as said vane moves in the direction thereof, the outer portion of said surface being curved on a radius materially less than that of the inner portion, spaced spiders having spokes to which the inner edges of said vanes are attached and forming a hub for said windrotor, and a tieband extending around the outer periphery of said vanes, stress rods interconnecting the outer edge of each of said vanes and the hub of the windrotor, and stress rods interconnecting intermediate portions of each of said vanes and said hub.

5. A windrotor according to claim 4 wherein certain of said stress rods interconnect the outer edge of one vane and an intermediate portion of the next adjacent vane.

STANLEY R. DU BRIE.

REFERENCES CITED

The following references are of record in the file of this patent:

UNITED STATES PATENTS

| Number | Name | Date |
|---|---|---|
| 154,407 | Mason | Aug. 25, 1874 |
| 529,197 | Rollason | Nov. 13, 1894 |
| 588,572 | Hardaway | Aug. 24, 1897 |
| 1,764,052 | Pfeifer | June 17, 1930 |
| 1,770,328 | Titterington | July 8, 1930 |
| 1,798,211 | Law | Mar. 31, 1931 |